No. 791,705. PATENTED JUNE 6, 1905.
A. B. LEES.
HOSE COUPLING.
APPLICATION FILED JULY 21, 1904.

Witnesses Adele B. Lees
Inventor
By her Attorney

No. 791,705.

Patented June 6, 1905.

UNITED STATES PATENT OFFICE.

ADELE B. LEES, OF GREAT BARRINGTON, MASSACHUSETTS.

HOSE-COUPLING.

SPECIFICATION forming part of Letters Patent No. 791,705, dated June 6, 1905.

Application filed July 21, 1904. Serial No. 217,483.

*To all whom it may concern:*

Be it known that I, ADELE B. LEES, a citizen of the United States, residing at Great Barrington, in the county of Berkshire and State of Massachusetts, have invented certain new and useful Improvements in Hose-Couplings, of which the following is a specification.

This invention relates to the class of easily-separable couplings for hose, such as garden-hose, fire-hose, and the like; and it has for its object to produce a simple, inexpensive, and durable coupling which may be easily connected and disconnected by any one through a partial rotation of the union and be made perfectly tight.

The coupling comprises simply two members to be attached to the respective sections of the hose and a union rotatable on but not normally separable from one of the members of the coupling. By the partial rotation of the union and the member on which it is mounted the members are brought together endwise on a packing-ring and held firmly against accidental separation in using the hose. The means employed for drawing the members together will be a spiral incline—as a screw, for example, or some equivalent means.

Figure 1:
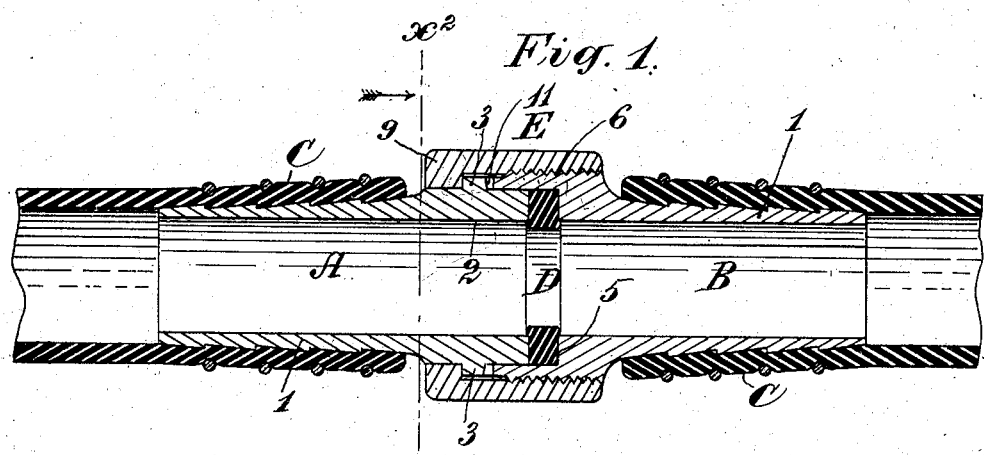
Figure 2:
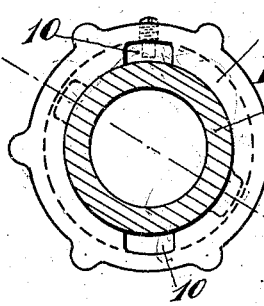
Figures 4, 5:
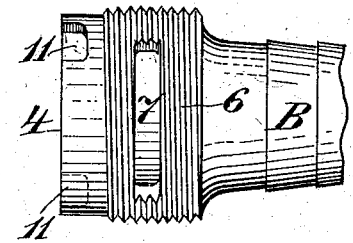
Figure 3:
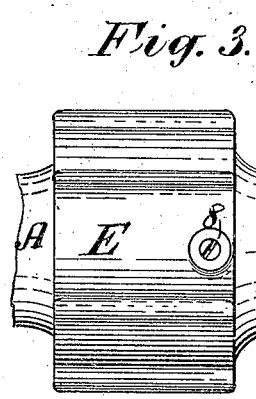
Figure 6:
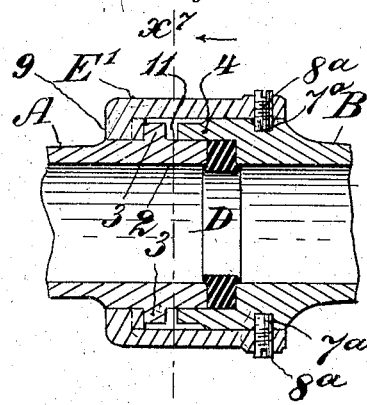
Figure 7:
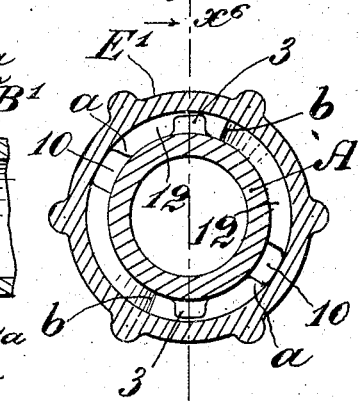

In the accompanying drawings, which illustrate an embodiment of the invention, Figure 1 is a longitudinal axial section showing the members coupled together. Fig. 2 is a transverse section at line $x^2$ in Fig. 1. In this figure the line $x'$ indicates the plane of the section of Fig. 1. Fig. 3 is a plan view of the middle part of the coupling as seen in Fig. 2. Fig. 4 is a fragmentary view of the entering end of the coupling member A. Fig. 5 is a similar fragmentary view of the coupling end of the coupling member B. Figs. 6 and 7 illustrate an equivalent construction which will be hereinafter described.

Referring, primarily, to the construction seen in Figs. 1 to 5, the coupling members A and B are tubular, and each is provided with a shank 1, which may be roughened to receive a section of hose C. The member A is cylindrical at its entering end 2 and has on it two lugs 3, oppositely disposed by preference. The member B is bored out at its coupling end 4 to receive the end 2 of the other member and to provide a shoulder 5, against which rests a rubber packing-ring D, against which the end of the member A abuts when the coupling is effected, as in Fig. 1. On this end of the member B is cut an external screw-thread 6, on which is screwed the union E, ribbed exteriorly, so as to be more easily turned by hand. In the outer screw-threaded surface of the member B is sunk a recess 7, (see Fig. 5,) which is engaged by the end of a screw or stud 8, Figs. 2 and 3, set in the union E. This is a limiting-stud, which permits the union to be rotated to a limited extent only and prevents the separation of the union from the member B except by removing the screw 8. The union has in its end where the member A is received an inturned flange 9, which fits quite snugly about the entering portion 2 of this member, and in this flange are formed two ways or notches 10 for the passage of the lugs 3 when the member A is inserted. In the entering end 4 of the member B are two oppositely-disposed notches or recesses 11, Fig. 5, which may be made to register with the ways 10 in the union by turning the latter back to its stop effected by the screw 8 and recess 7.

To effect the coupling, the union E is turned on the member B as far as it will go in the proper direction to move the union to the left in Fig. 1. This brings the ways 10 into register with the notches 11. The member A is now inserted by passing the lugs 3 through the ways 10 into the recesses or notches 11. The union is now turned in the opposite direction, so as to move it to the right in Fig. 1, the screw 6 causing this endwise movement of the union. The effect is to cause the flange 9 on the union, acting on the lugs 3, to draw in the member 1 and press its inner end forcibly against the packing-ring D. The notches 11 by engaging the lugs prevents the member A from turning with the union.

The screw 6 is for the purpose of drawing the member A up endwise against the packing-ring D, so as to produce a tight joint, and this may be effected by equivalent means. Such an equivalent is illustrated in Figs. 6 and 7, the former being a longitudinal section at line $x^6$ in Fig. 7 and the latter a transverse section of the union and one of the coupling members at line $x^7$ in Fig. 6. In this construction the member A and the packing-ring D are the same as before described. The member B' is substantially the same as that already described; but the screw-thread 6 is omitted therefrom, and limiting-screws $8^a$, set in the union, engage recesses $7^a$ in the member B'. The union E' does not move endwise, but has on the inner face of its flange 9 two inclines 12, (seen in Fig. 7,) which act on the respective lugs 3 when the union is turned in such a manner as to move the member A endwise and cause it to bear forcibly on the packing-ring D. The inclines 12 start from the margins of the respective ways 10 (indicated by $a$ in Fig. 7) and reach their highest elevation, say, at $b$ in said figure. This latter is not important, however.

It will be noted that the characteristic feature of the coupling is the formation on the end of the outer member B of an enlarged coupling end which receives the coupling end of the inner member A, the lugs 3 on the latter engaging the recesses 11 in the coupling end 4 of the outer member, so that when the union is turned for effecting the coupling the member B cannot turn therewith when the member A is held fast. This feature is common to both forms of coupling shown, as is also the limiting means, whereby when the union is turned back as far as the stop will permit the ways 10 in the union will be coincident with the recesses 11 in the member B.

Obviously the coupling described may be employed with hose for any purpose, as for compressed air or other gases, for air-brakes of cars, and the like, as the joint will be air and gas tight.

Having thus described my invention, I claim—

1. A coupling, having two tubular members, one enlarged at its coupling end to receive the entering end of the other member and provided with recesses, the inner member being provided with external lugs which engage said recesses in the end of the outer member, a packing between the members, a union rotatively mounted on the outer member, said union having an inturned flange to engage the lugs on the inner member and provided with ways therein for the passage of the said lugs, and means, actuated by the rotation of the union, for drawing the members together on the packing.

2. A coupling, having two tubular members, one enlarged at its coupling end to receive the entering end of the other member and provided with recesses, the inner member being provided with external lugs which engage said recesses in the end of the outer member, a packing between the members, a union rotatively mounted on the outer member, said union having an inturned flange to engage the lugs on the inner member and provided with ways therein for the passage of the said lugs, means for limiting the extent of rotation of the union, and means, actuated by the rotation of the union, for drawing the members together on the packing.

3. A coupling having two tubular members, one enlarged at its coupling end to receive the entering end of the other member and provided with recesses, the inner member being provided with external lugs which engage said recesses in the end of the outer member, a packing between the members, a union, which screws onto the coupling end of the outer member, said union having an inturned flange to engage the lugs on the inner member and ways therein for the passage of said lugs, and means for limiting the extent of rotation of said union.

4. In a coupling, the combination with the member A, provided with external lugs 3, the member B, provided with a coupling end 4, provided with recesses 11, a shoulder 5, and an external screw-thread 6, and the packing-ring D at said shoulder, of the union E, provided with an inturned flange 9, having in it ways 10, and with an internal screw-thread which engages the thread 6, and means, comprising the screw 8 and recess 7, for limiting the extent of rotation of the union.

In witness whereof I have hereunto signed my name, this 8th day of June, 1904, in the presence of two subscribing witnesses.

ADELE B. LEES.

Witnesses:
THOMAS J. SPELLAEY,
AUGUSTINE HOUERGAN.